United States Patent [19]

Anderson

[11] 4,313,498
[45] Feb. 2, 1982

[54] MEANS FOR STABILIZING EQUIPMENT SUPPORTED IN AN ENCLOSURE

[75] Inventor: Eric J. Anderson, Bedford, England

[73] Assignee: Hayward Tyler Limited, Luton, England

[21] Appl. No.: 70,289

[22] Filed: Aug. 28, 1979

[30] Foreign Application Priority Data

Aug. 29, 1978 [GB] United Kingdom ............... 34808/78

[51] Int. Cl.³ .............................................. E21B 40/00
[52] U.S. Cl. ...................................... 166/206; 188/67; 188/136; 403/374
[58] Field of Search ................................ 166/206–209, 166/217; 403/374, DIG. 7; 294/86.24; 285/24, 27; 188/67, 136, 139; 175/4.52

[56] References Cited

U.S. PATENT DOCUMENTS

210,575 12/1878 Stewart ........................... 166/206 X
1,980,985 11/1934 Deming .......................... 166/217 X Primary Examiner—Ernest R. Purser
Attorney, Agent, or Firm—Pollock, Vande Sande and Priddy

[57] ABSTRACT

The invention discloses apparatus for supporting a submersible pump motor unit in a stilling tube. The unit is suspended from a rising main. The stabilizing means comprises a plurality of sets of self-acting locking devices each having a cam fast on a shaft pivotally mounted in a bracket which shaft also carries counterweights which bias the cams radially outwardly.

Bearing plates are located on the stilling tube and the cams engage respective plates to lock the pump against lateral movement. Each set of devices consists of four devices disposed in a lateral plane equidistantly about the axis of the tube. The plurality of sets are spaced in the longitudinal direction of the pipe.

9 Claims, 6 Drawing Figures

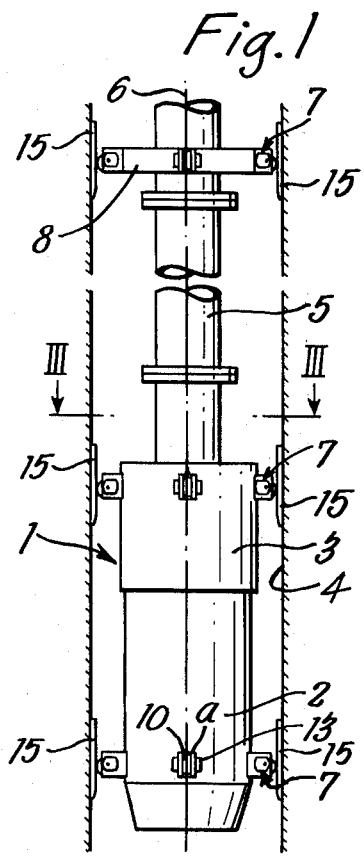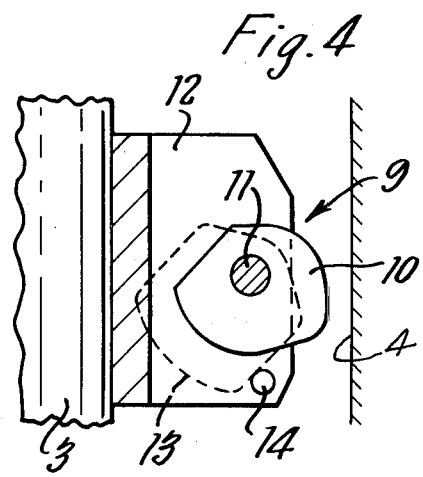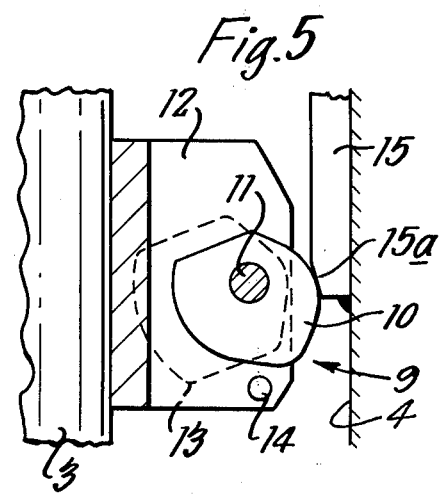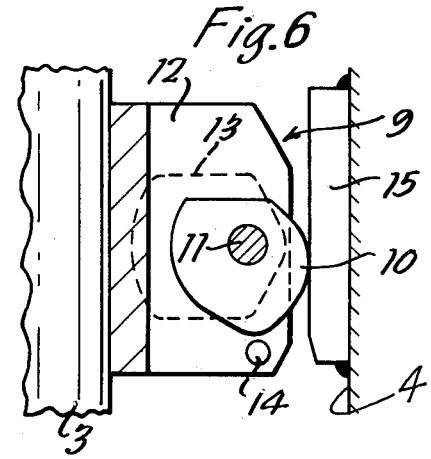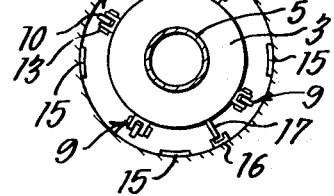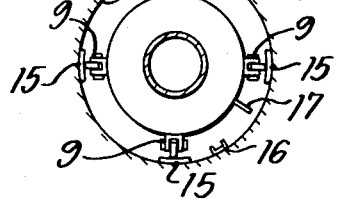

MEANS FOR STABILIZING EQUIPMENT SUPPORTED IN AN ENCLOSURE

This invention concerns means for stabilizing equipment in an enclosure, particularly but not exclusively a pump, submersible motor of the like apparatus suspended in a pipe or duct such as a so-called stilling tube, referred to hereinafter as a tube, or in an open frame. The stabilizing means is especially intended for situations in which the environment is difficult and the equipment is completely inaccessible, such as in undersea applications, or in a deep or narrow wall, where long term reliability and operability are essential.

Current practice is either to allow the equipment to hang freely within the tube or to provide it, and possibly a rising main, to which equipment is connected with a spider to act as a spacer, in which case either the spider will be a clearance fit within the tube or some form of spring location is provided. The known arrangements do not actually lock the equipment radially.

The invention seeks more particularly to provide a simple reliable means and method by which such apparatus can be located in a tube or frame, relative radial movement between the apparatus and tube or frame being effectively prevented despite the prevalence or occurrence of difficult conditions of operation. Furthermore, the said means is to allow or facilitate not only the introduction of the apparatus into the tube or frame, but also its removal by external means, for example by lifting of a motor/pump unit from the top of a stilling tube.

According to the present invention there is provided means for locking apparatus in a tube or frame having a longitudinal axis, including a plurality of locking devices operative between the apparatus and the tube or frame and having an engaging condition for preventing relative lateral movement between the apparatus and the tube or frame, the locking devices each including a cam biassed by at least one counterweight so that, in use, the cam is biassed to a position to take up lateral free play between the apparatus and the tube or frame to thereby prevent said relative lateral movement, the apparatus being movable in a longitudinal direction freely against the bias of the cams to enable the apparatus to be removed in said longitudinal direction from the tube or frame by external means.

The locking devices may be provided in sets, the devices of each set being equidistantly disposed about the apparatus, and a plurality of such sets may be provided, spaced in the longitudinal direction.

An embodiment of the invention will now be more fully described by way of example with reference to the accompanying drawings in which:

FIG. 1 shows a section through a stilling tube which contains a submersible unit located relative to the tube by stabilizing means, FIG. 2 shows a section along the line III—III of FIG. 1 when the submersible unit is being inserted in the tube.

FIG. 3 shows a section along the line III—III of FIG. 1 when the submersible unit is operatively located in the tube by the stabilizing means.

FIG. 4 shows a cam device in a free position,

FIG. 5 shows the cam device of FIG. 4 about to enter an operative position, and

FIG. 6 shows the cam device of FIGS. 4 and 5 in the operative position.

For this embodiment a submersible unit 1 consisting of a pump 2, for instance a centrifugal pump, surmounted and driven by an electric motor 3 is to be operated in a stilling tube 4. This unit 1 is suspended co-axially in the tube 4 on the axis 6 thereof at the lower end of a co-axial rising main 5 with which the pump delivery is in communication and which consists of a plurality of flange-coupled pipe lengths.

The stabilizing means comprises a plurality of sets 7 of self-acting cam devices (shown in greater detail in FIGS. 4 to 6), which sets 7 are spaced at vertical intervals with the cam devices of a set 7 at equal angular intervals in relation to the axis 6 of the tube 4. Thus, in addition to sets secured around the casings of the motor 3 and pump 2, a further set is secured by a spider 8 to the rising main 5. Each set 7 comprises four cam devices 9 at intervals of 90°. Each cam device 9 consists of a radially located lobed cam 10 in the form of a disc fast upon a shaft 11 which is pivotally mounted in the limbs of a U-bracket 12 and which shaft carries counterbalance weights 13 fast upon its ends. The cam 10 lies within the limbs of the U-bracket and the weights 13 lie outside. The cams 10 are biased by the weights so as to project to the maximum extent radially outwardly, in the direction towards the stilling tube 4, the weights 13 being arrested in this position by stops 14 fixed in the brackets 12.

For co-operating with the cams 10, a plurality of sets of vertical bearing plates 15 are secured to or formed upon the inner face of the stilling tube 4 at vertical and angular intervals corresponding to the vertical and angular intervals, respectively, between the cam devices 9. At their lower ends, each plate 15 has a chamfer or ramp 15a. The length of these plates 15 will depend upon the accuracy of the lengths of the rising main 5 and stilling tube 4. As shown in FIGS. 2 and 5, the stilling-tube is further provided, mid-way circumferentially between two vertical series of bearing plates with a guide channel 16 between the shanks of which a radial probe 17 on the pump or on the pump body, motor-body and/or rising main engages.

The sequence of actions for the installation of the unit 1 in the stilling tube 4 will now be described particularly with reference to FIGS. 4 to 6.

The unit 1 is positioned at the upper end of the stilling tube with the probe 17 in position within the bounds of the guide channel 16. As can be seen in FIG. 2 the cam devices 9 are not aligned vertically with respective bearing plates 15. The unit 1 is then lowered into the stilling tube 4. Further sets of cam devices 9 may be successively clamped to the rising main 5 at required intervals, using the guide channel 16 as a reference for establishing correct vertical alignment of the said devices 9. The cam devices 9 freely pass the bearing plates 15 during the descent because they are not in vertical alignment therewith.

The unit is lowered to a level below its final required level. In this position, all of the sets of the cam devices 9 are below the levels of the lower edges of the respective bearing plates and are in the position shown in FIG. 4. Also the probe 17 is below the lower end of the guide channel 16 and free from engagement with the latter. The rising main 5 and the unit 1 are then turned about their vertical axis through the angle necessary to bring the cam devices 9 into vertical alignment with the respective bearing plates 15. A suitable angle may be 30°. The rising main 5 and unit 1 are next raised until the cams 9 encounter the bearing plates 15 and are thereby turned to a slight extent against the bias of the weights 13, firmly locking the unit 1 radially in the stilling tube.

Individual cams 9 turn independently, remaining in surface contact with their respective bearing plates 15 under the influence of their counter-weights 13. The ramps 15a on the lower edges of the bearing plates 15 facilitate running of the cams 9 onto the plates 15 as shown in FIG. 5.

When the unit 1 has been locked at the required level normal clamping arrangements may be established at the head of the stilling tube 4 to clamp the rising main 5. If the unit 1 should tend to descend under its weight, the cams 9 by virtue of their profile will be urged outwardly to hold the radially locked unit at the required level. Small clearances caused, say by vibrations, will be taken up by the action of the counter weights, producing even tighter locking. The use of sets of cam devices each of which acts individually according to its immediate surroundings ensures a distributed locking action, so that the unit 1 becomes in effect a single structure with the stilling tube 4.

When the unit 1 requires to be lifted out from the stilling tube 4 for maintenance of dismantling, the cams 9 are free from contact with the plates 15 by lifting or turning the unit 1 which becomes automatically unlocked, so that the unit can be raised in normal fashion, since for movement in this upward direction the cams move freely against the bias of the weights, as they do not "dig-in" to the bearing plates.

The above-described arrangement has the advantage that it is mechanically self-acting. It requires no operating levers, rods, pipes or the like liable to fail or foul. Also it is self-releasing.

I claim:

1. Means for locking apparatus in a tube or frame having a longitudinal axis, including a plurality of locking devices operative between the apparatus and the tube or frame and having an engaging condition for preventing relative lateral movement between the apparatus and the tube or frame, the locking devices including a cam, at least one counterweight biasing the cam outwardly to a position, in use, to take up lateral free play between the apparatus and the tube or frame to thereby prevent said relative lateral movement, each said locking device comprising a U-shaped bracket, and a shaft pivotably mounted about an axis in the arms of the U-shaped bracket, the cam being fast on said shaft and said at least one counterweight also being fast on said shaft offset from the axis thereof and arranged to bias the cam to an engaging position, and external means for removing the apparatus from the tube or frame in a longitudinal direction, the apparatus being movable freely against the bias of the cams in said longitudinal direction by said external means.

2. Means for locking apparatus in a tube or frame as claimed in claim 1 including cam engagement surfaces adapted to be engaged by the cams to prevent said lateral movement.

3. Means for locking apparatus in a tube or frame, as claimed in claim 2 wherein said cam engagement surfaces project towards the apparatus from said tube or frame.

4. Means for locking apparatus in a tube or frame, as claimed in claim 1 wherein a plurality of said locking devices form a set of locking devices which are mounted in a lateral plane and are spaced equidistantly about the apparatus.

5. Means for locking apparatus in a tube or frame as claimed in claim 1 wherein, in use, said devices are mounted on the apparatus, the cams being biassed outwardly towards engagement with said tube or frame.

6. Means for locking apparatus in a tube or frame as claimed in claim 5 wherein a plurality of said sets are provided spaced in the longitudinal direction.

7. Means for locking apparatus in a tube or frame as claimed in claim 5 further including a longitudinal guide channel adapted to be mounted on said tube or frame, and a probe on the apparatus adapted to engage said guide channel to guide the apparatus for movement in the longitudinal direction to a required position.

8. Means for locking apparatus in a tube or frame as claimed in claim 1 wherein said apparatus comprises a submersible pump.

9. Means for locking apparatus in a tube or frame as claimed in claim 8 wherein said external means comprises a rising main to which the submersible pump is connected and through which the pump is moved to a required position.

* * * * *